United States Patent
Pantin

(10) Patent No.: US 10,509,608 B2
(45) Date of Patent: Dec. 17, 2019

(54) PRINT TARGET DATA TRANSFER SYSTEM AND IMAGE FORMING APPARATUS

(71) Applicant: KYOCERA Document Solutions Inc., Osaka (JP)

(72) Inventor: Carl Christian Ray Pantin, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/023,629

(22) Filed: Jun. 29, 2018

(65) Prior Publication Data

US 2019/0026050 A1    Jan. 24, 2019

(30) Foreign Application Priority Data

Jul. 18, 2017    (JP) .................. 2017-139411

(51) Int. Cl.
    *G06F 3/12*    (2006.01)

(52) U.S. Cl.
    CPC .......... *G06F 3/1222* (2013.01); *G06F 3/1238* (2013.01); *G06F 3/1256* (2013.01); *G06F 3/1207* (2013.01); *G06F 3/1292* (2013.01)

(58) Field of Classification Search
    CPC .... G06F 3/1222; G06F 3/1238; G06F 3/1256; G06F 3/1259; G06F 3/1267; G06F 3/1285; G06F 3/1291; G06F 3/1207; G06F 3/1292

USPC ....................... 358/1.14, 1.15, 1.9
See application file for complete search history.

(56) References Cited

U.S. PATENT DOCUMENTS

2017/0075635 A1*    3/2017    Maemura ........... H04N 1/00244

FOREIGN PATENT DOCUMENTS

JP    2012-076257 A    4/2012

* cited by examiner

*Primary Examiner* — Quang N Vo
(74) *Attorney, Agent, or Firm* — IP Business Solutions, LLC

(57) ABSTRACT

A print target data transfer system includes first and second image forming apparatuses and a user terminal. The first image forming apparatus accepts print target data, stores it, and sends notification information containing meta-information on the print target data to a user terminal as a notification destination. The user terminal displays the meta-information contained in the received notification information, accepts a user's selection of an arbitrary one from pieces of print target data indicated by the meta-information, and sends to the first image forming apparatus a request to transfer the selected piece of print target data to the second image forming apparatus. The first image forming apparatus transfers the piece of print target data to the second image forming apparatus according to the request. The second image forming apparatus receives the transferred piece of print target data and executes processing for printing the piece of print target data.

8 Claims, 12 Drawing Sheets

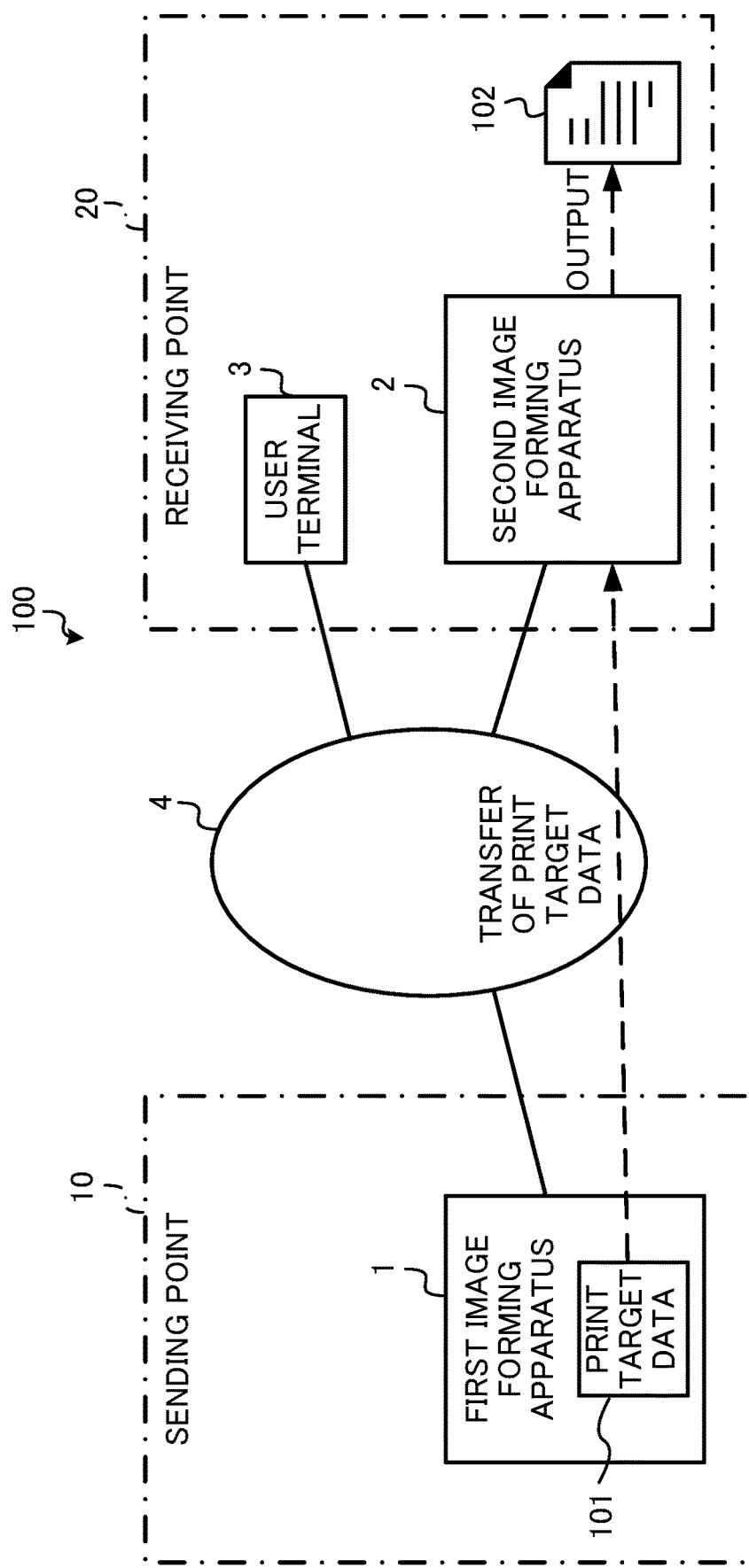

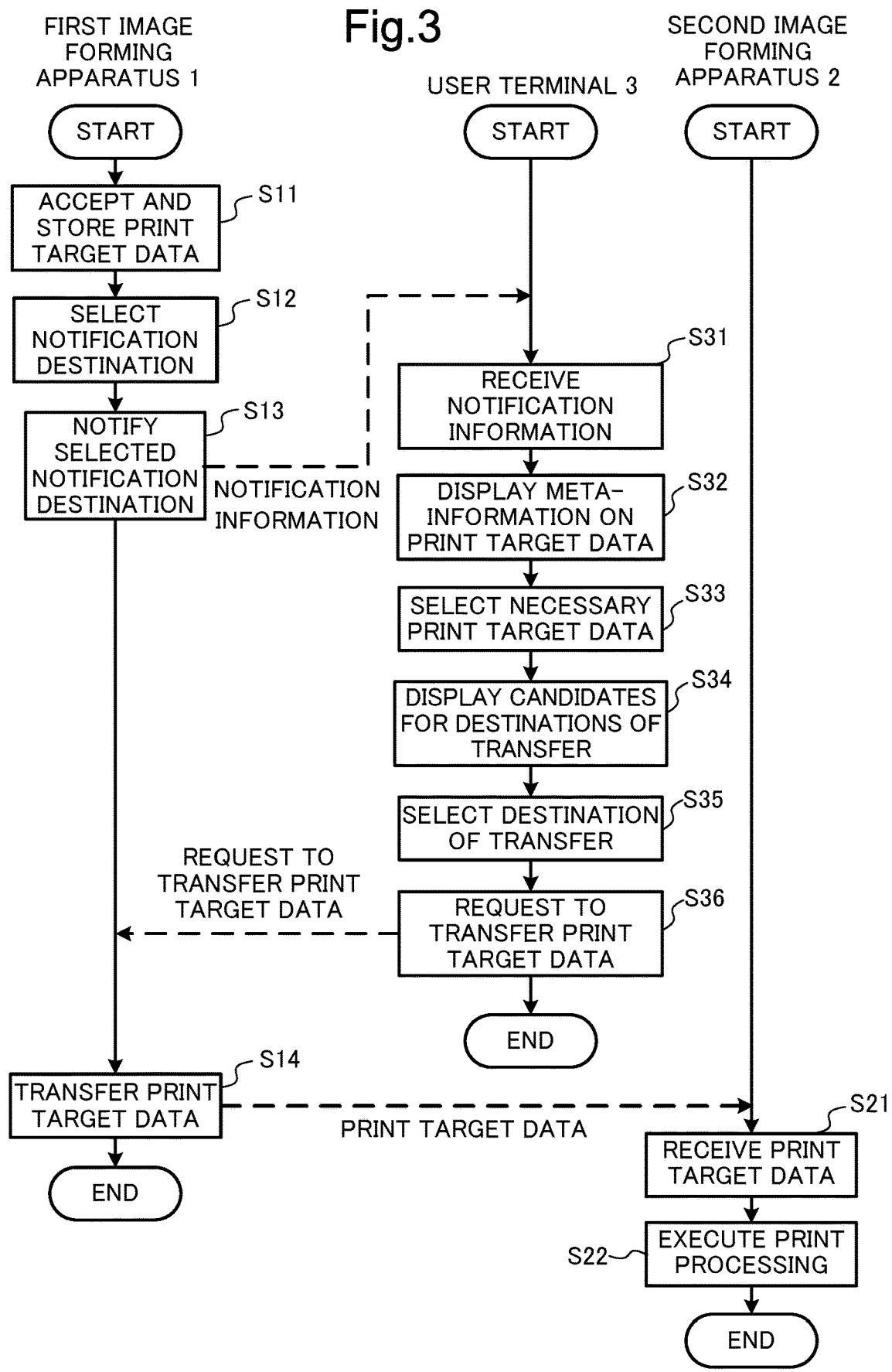

Fig.4B

| | MAC ADDRESS | DEVICE INFO | STATUS |
|---|---|---|---|
| | A0:D7:96:00:00:00 | MOBILE SH | CONNECTED |
| | A0:D7:96:00:00:01 | MOBILE 7 | CONNECTED |
| | A0:D7:96:00:00:02 | MOBILE SH | CONNECTED |
| | A0:D7:96:00:00:03 | MOBILE 8 | CONNECTED |
| | A0:D7:96:00:00:05 | MOBILE 7 | CONNECTED |
| | | | |
| | | | |
| | | | |
| | | | |

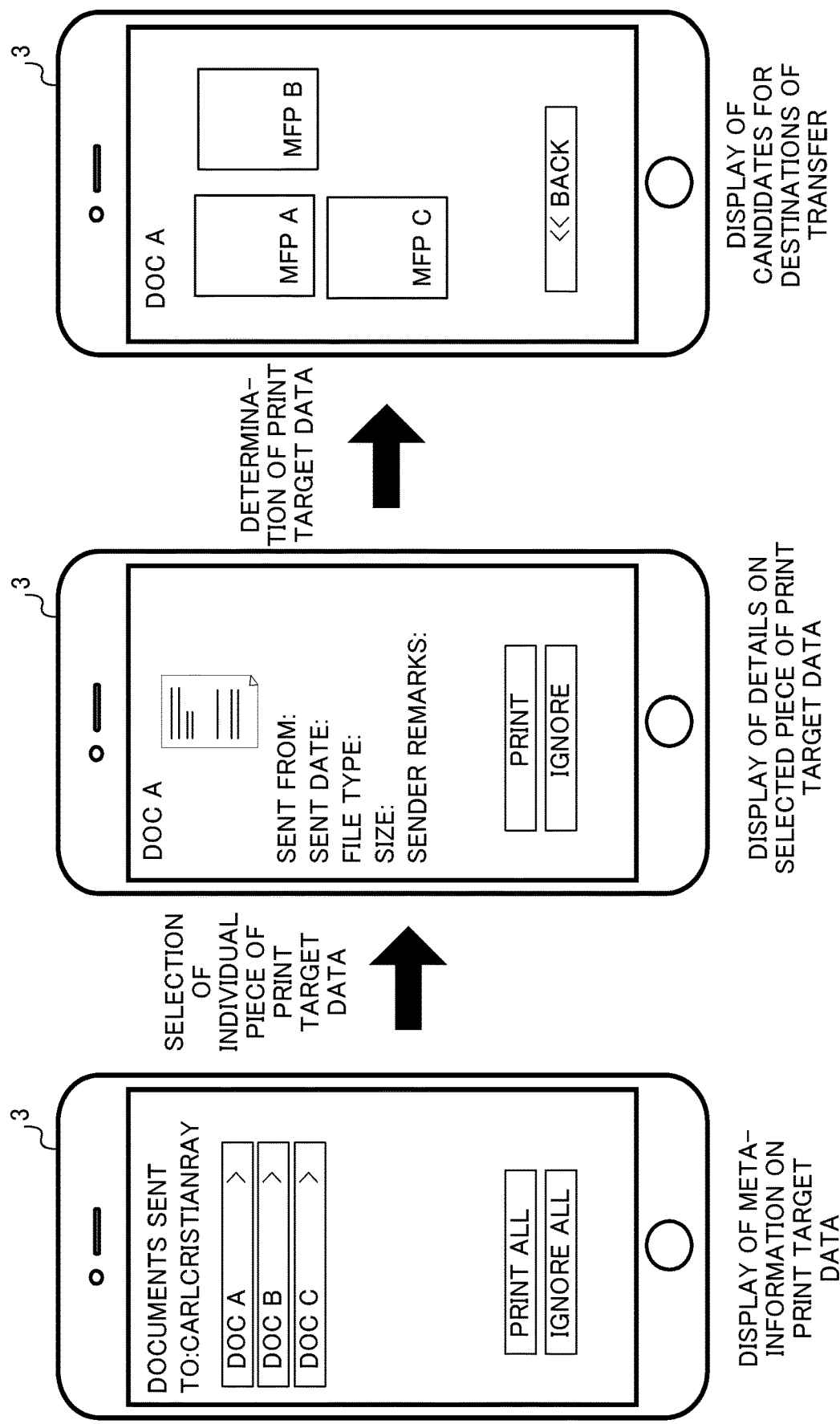

Fig.6B

| DIRECTORY | STATUS |
|---|---|
| //PPCPPC433/bjejgutrbrtlqpg/notification_here | CONNECTED |
| //PPCPPC423/bjejgutrbcklqpg/notification_here | CONNECTED |
| //PPCPPC454/bjejgutopcklqpg/notification_here | CONNECTED |
| | |
| | |
| | |
| | |
| | |

Fig.7
DISPLAY OF META-INFORMATION ON PRINT TARGET DATA
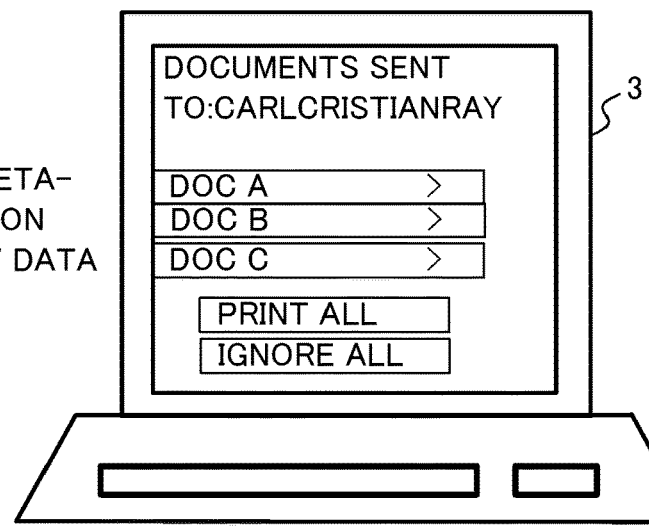
SELECTION OF INDIVIDUAL PIECE OF PRINT JOB DATA
DISPLAY OF DETAILS ON SELECTED PIECE OF PRINT TARGET DATA
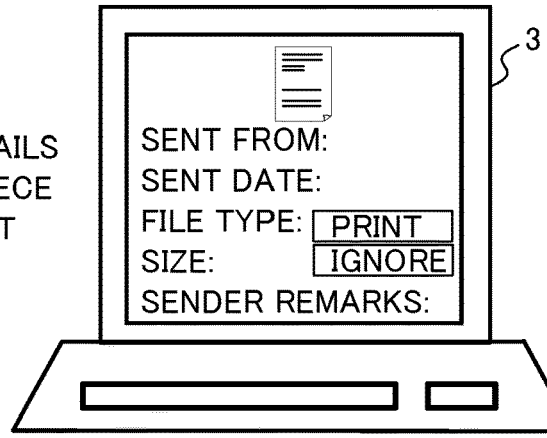
DETERMINATION OF PRINT JOB DATA
DISPLAY OF CANDIDATES FOR DESTINATIONS OF TRANSFER
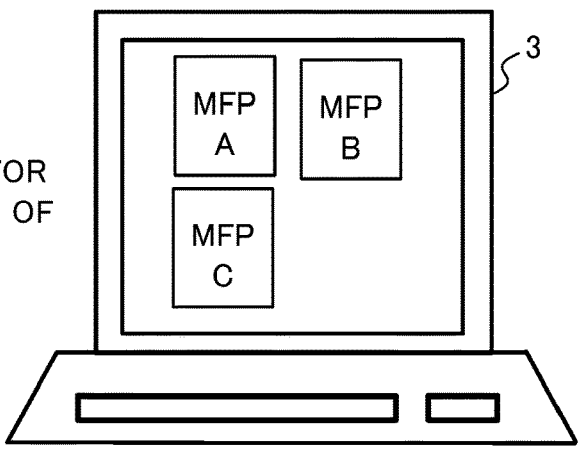

Fig.8B

| | EMAIL-ADDRESS | TYPE | STATUS |
|---|---|---|---|
| | rouge@ddp.kyocee.com | OFFICIAL | ONLINE |
| | golito@rrmail.jp | EXTERNAL | UNKNOWN |
| | white@ddp.kyocee.com | OFFICIAL | OFFLINE |
| | | | |
| | | | |
| | | | |
| | | | |
| | | | |
| | | | |

M — MAIL WILL BE SENT TO OUTSIDE THE COMPANY. DO YOU WANT TO CONTINUE?

PRINT TARGET DATA TRANSFER SYSTEM AND IMAGE FORMING APPARATUS

INCORPORATION BY REFERENCE

This application claims priority to Japanese Patent Application No. 2017-139411 filed on 18 Jul. 2017, the entire contents of which are incorporated by reference herein.

BACKGROUND

The present disclosure relates to print target data transfer systems and image forming apparatuses and particularly relates to a technique for delivering a document to another person being in a geographically and temporally different environment so that the other person can safely make a hard copy of the document.

In recent years, image forming apparatuses, such as printers and multifunction peripherals, are being connected to networks. Therefore, even if an image forming apparatus is in a remote location, print target data can be transferred to the image forming apparatus and output as a desired hard-copy document from it. However, in outputting a document on a remote image forming apparatus, the document is at risk of being seen or taken away by an unexpected third party. Particularly, in delivering a highly secret document to a particular person being in a remote location, it is problematic in terms of safety to simply send print target data to an image forming apparatus in a remote location and allow the image forming apparatus to perform print processing for the print target data.

In relation to printing of a classified document, for example, an image forming apparatus is known which, upon receipt of an external request to execute printing of the classified document, determines whether or not a source user of the request is in a remote location and, when the user is in a remote location, determines that the case applies to a condition for changing the requested printing to secret printing, and changes the requested printing to the secret printing. According to this known technique, the user can carry out secret printing without the need for any additional operation.

SUMMARY

A technique improved over the aforementioned technique is proposed as one aspect of the present disclosure.

A print target data transfer system according to an aspect of the present disclosure includes a first image forming apparatus, a second image forming apparatus, and a user terminal. The first image forming apparatus includes a storage section that stores data and a control unit. The control unit includes a processor, wherein when the processor executes a control program, the control unit functions as: a print target data acceptance section that accepts print target data and allows the storage section to store the accepted print target data; and an information notifying section that generates notification information notifying that the print target data has been accepted, the notification information containing meta-information on the print target data, and sends the generated notification information to a designated notification destination. The user terminal includes: a terminal-side display section; a data sending/receiving section that receives the notification information from the first image forming apparatus; a terminal-side control unit including a processor, wherein when the processor executes a control program, the terminal-side control unit functions as a terminal-side control section that allows the terminal-side display section to display the meta-information on the print target data contained in the notification information received by the data sending/receiving section; and a terminal-side operating section that accepts a selection of an arbitrary piece of print target data from among pieces of print target data indicated by the meta-information which the terminal-side display section is allowed to display by the terminal-side control section. The terminal-side control section sends to the first image forming apparatus a transfer request to transfer to the second image forming apparatus the piece of print target data the selection of which has been accepted by the terminal-side operating section. In the first image forming apparatus, the control unit further functions as a print target data transfer section that transfers the selected piece of print target data to the second image forming apparatus according to the transfer request sent from the user terminal. The second image forming apparatus receives the piece of print target data transferred from the first image forming apparatus according to the transfer request from the user terminal and executes processing for printing the received piece of print target data.

An image forming apparatus according to another aspect of the present disclosure includes a storage section and a control unit. The storage section stores data. The control unit includes a processor, wherein when the processor executes a control program, the control unit functions as: a print target data acceptance section that accepts print target data and allows the storage section to store the accepted print target data; an information notifying section that generates notification information notifying that the print target data has been accepted, the notification information containing meta-information on the print target data, and sends the generated notification information to a user terminal as a designated notification destination; and a print target data transfer section that transfers, according to a transfer request sent from the user terminal, print target data indicated by the transfer request to a second image forming apparatus as a destination of transfer indicated by the transfer request.

BRIEF DESCRIPTION OF THE DRAWINGS

FIG. 1 is a conceptual diagram of a print target data transfer system according to one embodiment of the present disclosure.

FIG. 3 is a flowchart showing print target data transfer processing of the print target data transfer system and communications of information between apparatuses.

FIG. 4B is an enlarged view of a user terminal list in FIG. 4A.

FIG. 5 is a view showing an example of a screen transition on a mobile device as a user terminal.

FIG. 6B is an enlarged view of a directory list in FIG. 6A.

FIG. 7 is a view showing an example of a screen transition on a computer as a user terminal.

FIG. 8B is an enlarged view of a mail address list in FIG. 8A.

DETAILED DESCRIPTION

Figure 2A:
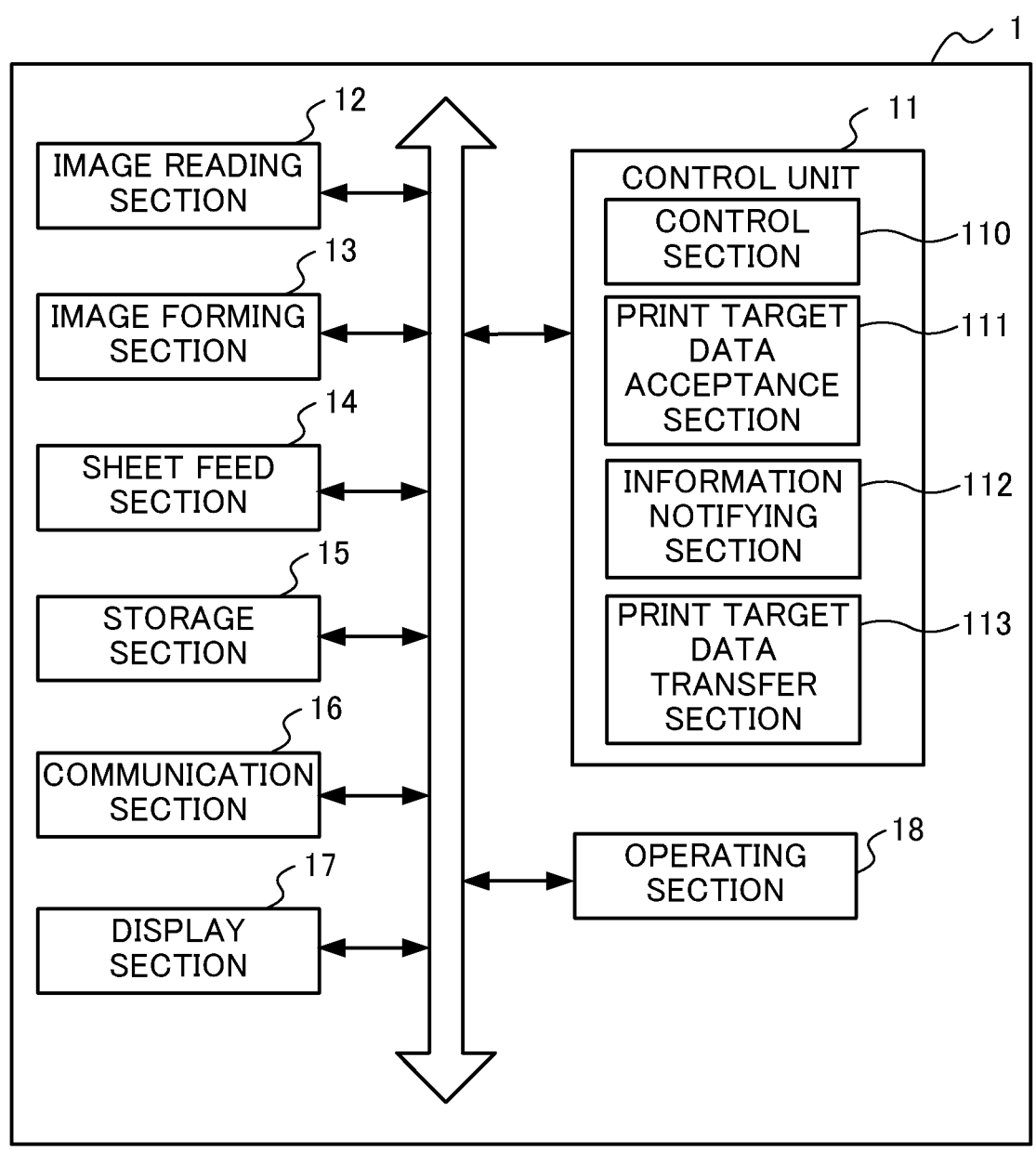
FIG. 2A is a functional block diagram showing an essential internal configuration of an image forming apparatus located at a sending point.

Hereinafter, a description will be given of a print target data transfer system according to one embodiment of the present disclosure with reference to the drawings.

FIG. 1 is a conceptual diagram of a print target data transfer system according to the one embodiment of the present disclosure. The print target data transfer system 100 according to this embodiment is composed of a first image forming apparatus 1 located at a sending point 10, a second image forming apparatus 2 located at a receiving point 20, and a user terminal 3 located at the receiving point 20.

The sending point 10 and the receiving point 20 are far away from each other and connected to each other via a network 4, such as the Internet. The first image forming apparatus 1 and the second image forming apparatus 2 are communicable with each other via the network 4. For example, the user terminal 3 is communicable with the first image forming apparatus 1 via the network 4 and communicable with the second image forming apparatus 2 via a LAN (local area network). Specifically, the user terminal 3 is a mobile device, such as a smartphone or a tablet terminal, or a computer, such as a desktop PC or a laptop PC.

In the print target data transfer system 100 according to this embodiment, print target data 101 accepted by the first image forming apparatus 1 located at the sending point 10 is temporarily stored on the first image forming apparatus 1. The first image forming apparatus 1 transfers the print target data 101 to the second image forming apparatus 2 located at the receiving point 20 only when requested from the user terminal 3. In the second image forming apparatus 2, the print target data 101 is subjected to print processing and output as a document 102.

More specifically, a user of the user terminal 3 can have the print target data 101, which has been accepted in the first image forming apparatus 1 located in a remote location (at the sending point 10), sent from the first image forming apparatus 1 to the second image forming apparatus 2 located where the user is (at the receiving point 20), and allow the second image forming apparatus 2 to subject the print target data 101 to print processing, thus safely and securely acquiring the document 102. Note that in the following description a user operating the user terminal 3 and thus receiving the document 102 output from the second image forming apparatus 2 is also referred to as a receiver and a user operating the first image forming apparatus 1 to have the document 102 sent to the receiver is also referred to as a sender.

FIG. 2A is a functional block diagram showing an essential internal configuration of the first image forming apparatus 1 located at the sending point 10. The first image forming apparatus 1 is a multifunction peripheral having a plurality of functions, including a facsimile communication function, a copy function, a print function, and a scan function. The first image forming apparatus 1 includes a control unit 11, an image reading section 12, an image forming section 13, a sheet feed section 14, a storage section 15, a communication section 16, a display section 17, and an operating section 18.

The image reading section 12 is a scanner for optically reading an original document being conveyed by an unshown document conveyance section or an original document placed on an unshown original glass plate.

The storage section 15 temporarily stores print target data 101 accepted by a print target data acceptance section 111 to be described hereinafter. The storage section 15 may be formed of a large storage device, such as an HDD (hard disk drive).

The image forming section 13 forms (prints) an image on a sheet fed from the sheet feed section 14, using the print target data 101 stored in the storage section 15. The printed sheet is output to an unshown sheet output tray provided in the first image forming apparatus 1.

The communication section 16 is a communication interface including an unshown communication module, such as a LAN chip. The first image forming apparatus 1 is communicable with the second image forming apparatus 2 and the user terminal 3 via the network 4 to transfer data to and from the second image forming apparatus 2 and the user terminal 3 through the communication section 16.

The display section 17 (an example of the first display section defined in What is claimed is) is formed by including a liquid crystal display (LCD) or an organic EL (OLED: organic light-emitting diode) display. The display section 17 displays below-described various lists on its screen. The display section 17 includes a touch panel. When the user performs an operation by a touch gesture directly on a screen displayed on the display section 17, the touch panel accepts an instruction based on the operation. The touch panel functions as part of the operating section 18.

The operating section 18 (an example of the first operating section defined in What is claimed is) includes, for example, a Start key for instructing execution of a print job or others, a determination key (Enter key) for use in performing a determination operation for a GUI (graphical user interface) forming an operation screen, and numerical entry keys for use in entering numerical values, and, for example, accepts user's operations regarding screens displayed on the display section 17.

The control unit 11 is formed of a processor, a RAM (random access memory), a ROM (read only memory), and so on. The processor is, for example, a CPU (central processing unit), an ASIC (application specific integrated circuit) or an MPU (micro processing unit). When a computer program stored in the above ROM or the storage section 15 is executed by the above processor, the control unit 11 functions as a control section 110, a print target data acceptance section 111, an information notifying section 112, and a print target data transfer section 113. Alternatively, each component (the control section 110, the print target data acceptance section 111, the information notifying section 112, and the print target data transfer section 113) of the control unit 11 may not be implemented by the operation of the control unit 11 in accordance with the above computer program but may be constituted by a hardware circuit.

The control section 110 governs the overall operation control of the first image forming apparatus 1. The control section 110 is connected to the image reading section 12, the image forming section 13, the sheet feed section 14, the storage section 15, the communication section 16, the display section 17, the operating section 18, and so on and performs the operation control of the above components connected thereto and signal or data transfer to and from the components.

The print target data acceptance section 111 accepts print target data 101 and allows the storage section 15 to store the print target data 101. The print target data 101 is, for example, one obtained by converting image data read as a print target by the image reading section 12, document data or image data sent as a print target from an outside source or like data into, for example, a PRN file by a printer driver installed on the first image forming apparatus 1. Thus, the print target data 101 (a PRN file) can be printed, using the same printer driver, on the second image forming apparatus 2.

The print target data 101 is a target to be printed on the second image forming apparatus 2, but not a target to be printed by the image forming section 13 of the first image forming apparatus 1. Therefore, the print target data 101 is not subjected to print processing on the first image forming apparatus 1, nor is a document 102 derived from the print target data 101 output from the first image forming apparatus 1. Hence, there is no need for concern about the document 102 being seen by unexpected users on the first image forming apparatus 1.

The information notifying section 112 sends, to a designated notification destination, notification information notifying that print target data 101 has been accepted in the first image forming apparatus 1. The sending of this notification information is performed through the communication section 16. The notification information contains meta-information on the print target data 101. The meta-information is accompanying information and includes the date of creation of the print target data 101, the IP address of the first image forming apparatus 1 having accepted the print target data 101, the creator (sender) of the print target data 101, and the title of a document contained in the print target data 101. As will be described hereinafter, the user can select a notification destination of the notification information.

When the print target data transfer section 113 receives, through the communication section 16 from the user terminal 3, a transfer request to transfer print target data 101 to the second image forming apparatus 2, it complies with the request to read the print target data 101 from the storage section 15 and transfer the read print target data 101 through the communication section 16 to the second image forming apparatus 2. The transfer of this print target data 101 is performed through the communication section 16. The print target data transfer section 113 may delete the print target data 101 from the storage section 15 after transferring the print target data 101 to the second image forming apparatus 2. Thus, unauthorized acts can be prevented, such as unexpected print processing subjected to the print target data 101 remaining in the storage section 15 by the first image forming apparatus 1 or unexpected transfer of the print target data 101 to another image forming apparatus.

Figure 2B:
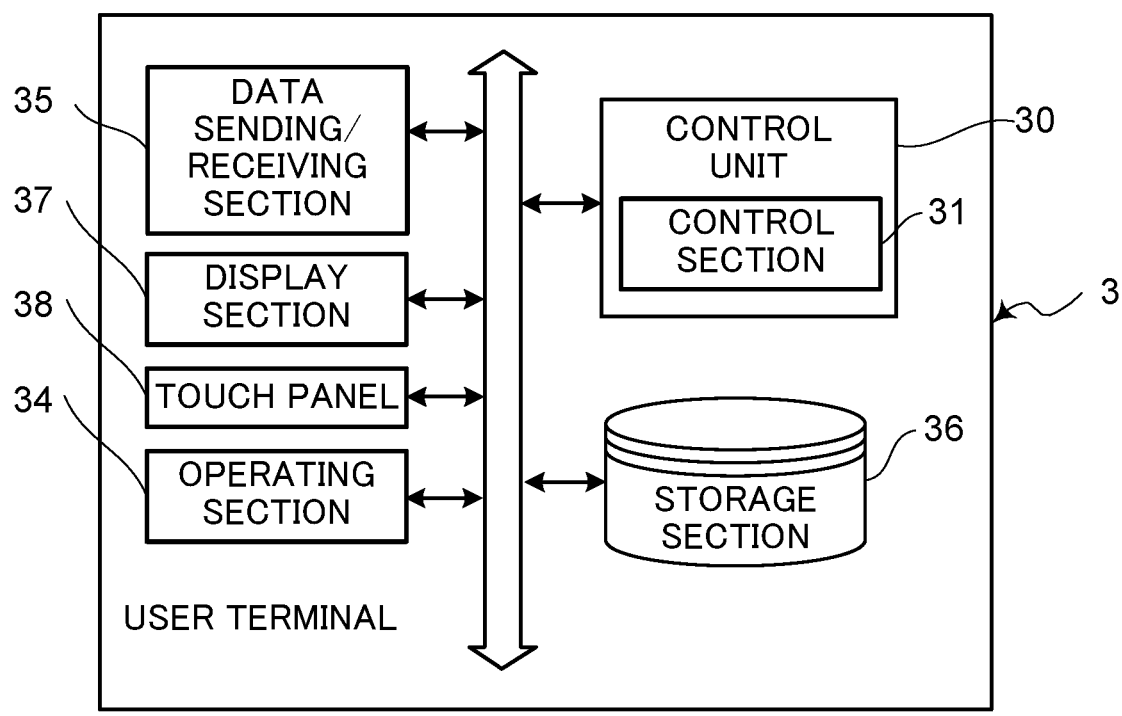
FIG. 2B is a functional block diagram showing an essential internal configuration of a user terminal.

FIG. 2B is a functional block diagram showing an essential internal configuration of the user terminal 3. The user terminal 3 is, for example, a PC or a smartphone and includes a control unit 30, a display section 37, a touch panel 38, an operating section 34, a data sending/receiving section 35, and a storage section 36. These components are capable of data or signal transfer via a bus among them.

The display section 37 (an example of the terminal-side display section defined in What is claimed is) is formed of a liquid crystal display (LCD), an organic EL (OLED: organic light-emitting diode) display or the like.

The touch panel 38 (an example of the terminal-side operating section defined in What is claimed is) is, for example, a touch panel of a so-called resistive film system or a capacitance system. This touch panel 38 is disposed on the screen of the display section 37 and detects a touch of a soft key or the like on the screen of the display section 37 with a finger or the like, together with the point of touch. When detecting a touch thereon with a finger or the like, the touch panel 38 outputs a detection signal indicating the coordinate of the point of touch to the control unit 30. Therefore, the touch panel 38 serves as the terminal-side operating section through which a user's operation on the screen of the display section 37 is to be input.

The operating section 34 (an example of the terminal-side operating section defined in What is claimed is) include a keyboard and a pointing device.

The data sending/receiving section 35 is a communication interface including an unshown communication module, such as a LAN chip. The data sending/receiving section 35 is connected via the network 4, such as the Internet, to the first image forming apparatus 1 and transfers data to and from the first image forming apparatus 1. The data sending/receiving section 35 is also connected via the LAN to the second image forming apparatus 2 and transfers data to and from the second image forming apparatus 2.

The storage section 36 is a large storage device, such as an SSD (solid state drive) or an HDD (hard disk drive).

The control unit 30 (an example of the terminal-side control unit defined in What is claimed is) is formed of a processor, a RAM (random access memory), a ROM (read only memory), and so on. The processor is, for example, a CPU, an MPU or an ASIC. When a control program stored in the above ROM or the storage section 36 is executed by the above processor, the control unit 30 functions as a control section 31. Alternatively, the control section 31 of the control unit 30 may not be implemented by the operation of the control unit 30 in accordance with the above control program but may be constituted by a hardware circuit.

The control section 31 (an example of the terminal-side control section defined in What is claimed is) governs the overall operation control of the user terminal 3. The control section 31 is connected to the display section 37, the touch panel 38, the operating section 34, the data sending/receiving section 35, the storage section 36, and so on and performs the operation control of these components and signal or data transfer to and from these components. Furthermore, the control section 31 serves as a processing section that executes processing according to the operation of the touch panel 38 and the operating section 34.

The control section 31 has the function of controlling the communication operation of the data sending/receiving section 35. Furthermore, the control section 31 has the function of controlling the display operation of the display section 37.

The configuration of the second image forming apparatus 2 is the same as the previously described configuration of the first image forming apparatus 1. Therefore, in the following description, the components of the second image forming apparatus 2 will be referred to by the same reference characters as those of corresponding components of the first image forming apparatus 1.

Next, a description will be given of print target data transfer processing of the print target data transfer system 100 according to this embodiment. FIG. 3 is a flowchart showing print target data transfer processing of the print target data transfer system 100 and communications of information between the apparatuses.

First, in the first image forming apparatus 1, the print target data acceptance section 111 accepts print target data 101, such as image data read by the image forming section 12 or image data sent from an outside source, and allows the storage section 15 to store the print target data 101 (step S11).

When the print target data 101 is accepted in the first image forming apparatus 1, the control section 110 allows the display section 17 to display an operation screen for the selection of a notification destination which is to be notified that the print target data 101 has been accepted. The operator (sender) of the first image forming apparatus 1 performs an operation from the operation screen to select a notification destination through the touch panel (operating section 18) (step S12).

When the notification destination is selected, the information notifying section 112 reads the print target data 101 from the storage section 15 and sends notification information through the communication section 16 to the selected notification destination (step S13). For example, when the user terminal 3 is selected as the notification destination, the information notifying section 112 sends the notification information to the user terminal 3. The following description will be given on the assumption that the user terminal 3 has been selected as the notification destination.

When in the user terminal 3 the data sending/receiving section 35 receives the notification information from the first image forming apparatus 1 (step S31), the control section 31 allows the display section 37 to display, on its screen, meta-information on the print target data 101 contained in the notification information (step S32). The user of the user terminal 3 performs an operation on the touch panel 38 to select, from the print target data 101 shown by a representation of the meta-information, all or part of the print target data 101 as necessary (step S33).

When the touch panel 38 accepts the selection of the necessary print target data 101, the control section 31 allows the display section 37 to display image forming apparatuses as candidates for destinations of transfer of the necessary print target data 101 (step S34). For example, the control section 31 previously detects image forming apparatuses connected via the LAN to the user terminal 3 and located within the area of the LAN and stores information on them. The control section 31 allows the display section 37 to display such image forming apparatuses as candidates for destinations of transfer. The user of the user terminal 3 performs an operation on the touch panel 38 to select an image forming apparatus as a destination of transfer of the necessary print target data 101 from among the candidates for destinations of transfer displayed on the display section (step S35). When the selection of a destination of transfer is accepted by the touch panel 38, the control section 31 sends, through the data sending/receiving section 35 to the first image forming apparatus 1, a transfer request requesting to transfer the selected necessary print target data 101 to the selected image forming apparatus (step S36).

When in the first image forming apparatus 1 the print target data transfer section 113 receives the transfer request to transfer the necessary print target data 101 through the communication section 16 from the user terminal 3, the print target data transfer section 113 reads the corresponding part or all of the print target data 101 from the storage section 15 according to the transfer request. The print target data transfer section 113 transfers the read print target data 101 through the communication section 16 to the selected image forming apparatus (assumed to be the second image forming apparatus 2 in this embodiment) which is a destination of transfer indicated by the transfer request (step S14).

When in the second image forming apparatus 2 the communication section 16 receives the above print target data 101 transferred from the first image forming apparatus 1 (step S21), the control section 110 of the second image forming apparatus 2 allows the image forming section 13 thereof to execute print processing for the print target data 101 (step S22). Thus, a document 102 is output from the second image forming apparatus 2, so that the user of the user terminal 3 can acquire the document 102.

As thus far described, in the print target data transfer system 100 according to this embodiment, when print target data 101 is accepted in the first image forming apparatus 1, notification information notifying that the print target data 101 has been accepted in the first image forming apparatus 1 and what the accepted print target data 101 is about is sent to another person (the receiver, specifically, the user terminal 3). At this point in time, the print target data 101 itself is not sent to the other person. When receiving the notification information, the other person can make a request to the first image forming apparatus 1 through the user terminal 3 to transfer necessary print target data 101. According to this transfer request, the necessary print target data 101 is transferred from the first image forming apparatus 1 to the second image forming apparatus 2 and then subjected to print processing on the second image forming apparatus 2.

The known technique previously described premises that a document which is derived from print target data sent from an external PC or the like to an image forming apparatus by a user and output from the image forming apparatus is received by the user himself/herself. Therefore, if the sender of the print target data is different from the receiver of the document, i.e., for example, if a user delivers a secret document to another user being in a remote location, the above known technique may not ensure the safety.

Unlike the above technique, in this embodiment, even if the user selects, on the user terminal 3, print target data 101 to be transferred to the second image forming apparatus 2, the second image forming apparatus 2 does not acquire the selected print target data 101 unless the user sends a transfer request to the first image forming apparatus 1. Therefore, while the print target data 101 can be kept safely stored in the first image forming apparatus 1 by preventing the print target data 101 from being easily sent to various apparatuses, a hard copy document of the print target data 101 can safely reach a person being in a geographically and temporarily different environment.

Possible examples of the method for notifying that the first image forming apparatus 1 has accepted print target data 101 include: a method of sending notification information directly to the user terminal 3; a method of storing notification information in a particular directory of the user terminal 3; and a method of sending notification information by mail. Hereinafter, a description will be given of respective examples of the above methods.

First Example

A first example is an example in which a mobile device, such as a smartphone or a tablet terminal, is used as the user terminal 3. In the first example, the first image forming apparatus 1 sends notification information directly to the mobile device as the user terminal 3.

In the first image forming apparatus 1, the control section 110 previously stores information on a plurality of user terminals as candidates for notification destinations of notification information. In sending the notification information, the control section 110 allows the display section 17 to display an operation screen for the selection of a notification destination which is to be notified that print target data 101 has been accepted.

Figure 4A:
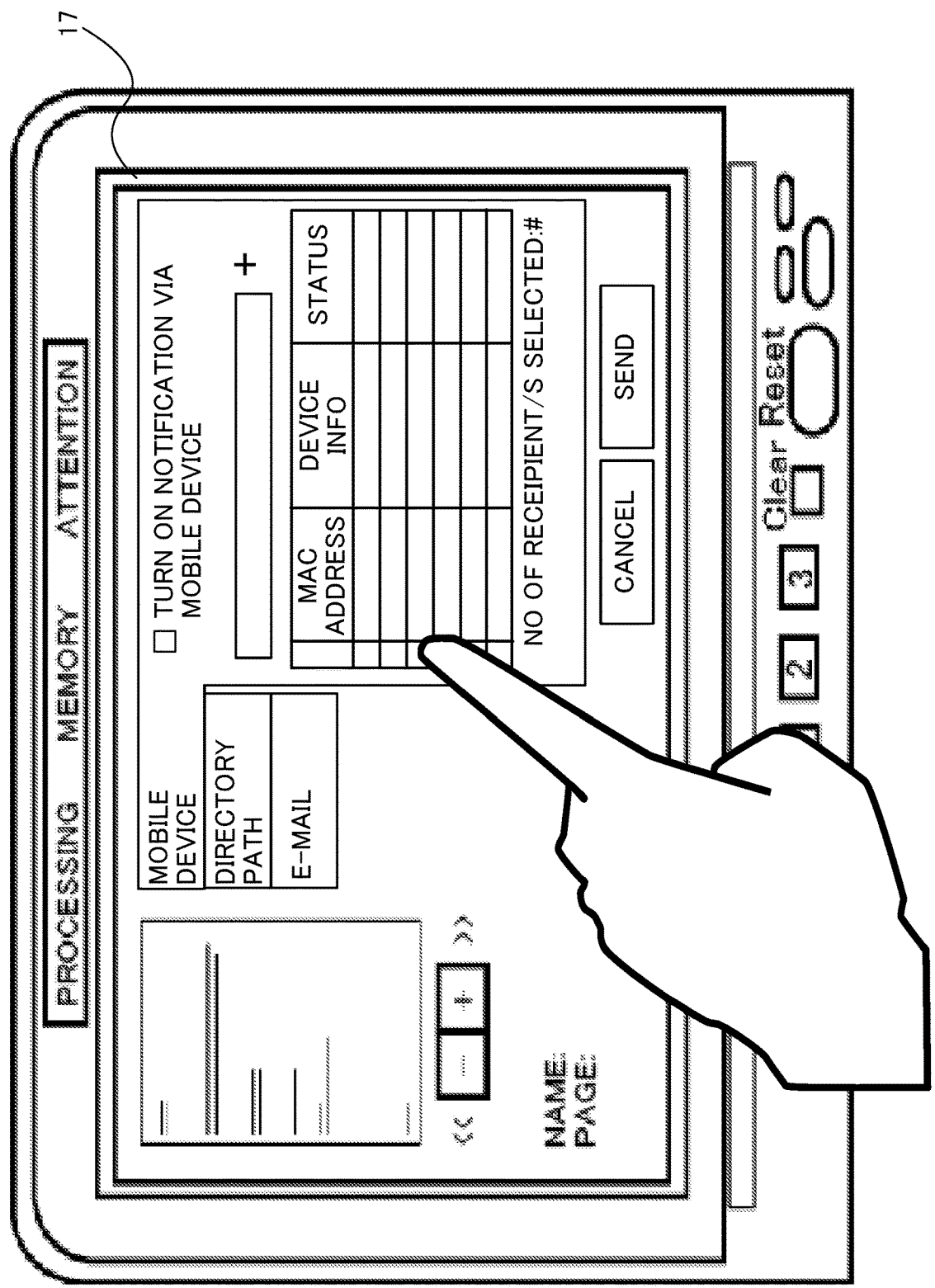
FIG. 4A is a view showing an example of an operation screen for selecting a user terminal as a notification destination on a display section of a first image forming apparatus.

FIG. 4A is a view showing an example of an operation screen for selecting a mobile device as a notification destination on the display section 17 of the first image forming apparatus 1. FIG. 4B is an enlarged view of a user terminal list in FIG. 4A.

In the first image forming apparatus 1, the control section 110 previously stores the MAC (media access control) addresses of the plurality of mobile devices as candidates for notification destinations of notification information. The control section 110 allows the stored MAC addresses of the plurality of mobile devices to be displayed on the operation screen (see FIG. 4B). When the sender selects a notification destination by manipulating the user terminal list on the operation screen displayed on the display section 17, this selection is accepted by the touch panel (operating section 18). The touch panel is capable of accepting the selection of a plurality of notification destinations at a time.

The information notifying section 112 detects whether or not the mobile device selected as the notification destination is connected to the network 4 and, upon detection of the connection to the network 4, sends the notification information directly to the mobile device. If the touch panel has accepted the selection of a plurality of notification destinations, the information notifying section 112 sends the above notification information through the communication section 16 to each of the mobile devices selected as the notification destinations.

On the other hand, if the selected mobile device is not connected to the network 4, the information notifying section 112 delays the sending of the notification information until the mobile device is connected to the network 4 and, upon connection of the mobile device to the network 4, sends the notification information to the mobile device.

When receiving the notification information from the first image forming apparatus 1, the mobile device as the user terminal 3 displays on its screen meta-information on print target data 101 contained in the notification information as described previously.

FIG. 5 is a view showing an example of a screen transition on the mobile device as the user terminal 3. In the mobile device, upon receipt of the notification information from the first image forming apparatus 1, the control section 31 allows the display section 37 to display the meta-information on print target data 101. For example, as shown in FIG. 5, the control section 311 allows the display section 37 to display that three pieces of print target data 101, "Doc A", "Doc B", and "Doc C", have been accepted by the first image forming apparatus 1. The user of the user terminal 3 may make a touch gesture on an arbitrary one of the document titles on the display screen to select, through the touch panel function, an individual one of the pieces of print target data 101 or may make a touch gesture on a "Print All" button on the display screen to select all the pieces of print target data 101. Alternatively, if none of the pieces of print target data 101 is needed, the user makes a touch gesture on an "Ignore All" button. When the touch panel 38 accepts a touch gesture for selecting the "Ignore All" button, the control section 31 terminates the print target data transfer processing.

For example, when the user makes a touch gesture on an arbitrary document title on the screen shown in the left part of FIG. 5 to select an individual piece of print target data 101 and this selection is accepted by the touch panel 38, the control section 31 allows the display section 37 to display detailed information on the selected piece of print target data 101 (see the middle part of FIG. 5). Then, when the user makes a touch gesture on a "Print" button and this selection is accepted by the touch panel 38, the control section 31 allows the display section 37 to display a selection screen showing candidates for destinations of transfer of the piece of print target data 101 (see the right part of FIG. 5). When the user selects an arbitrary one of the destinations for transfer (for example, the second image forming apparatus 2) through the touch panel 38, the control section 31 sends, through the data sending/receiving section 35 to the first image forming apparatus 1, a transfer request to transfer the selected piece of print target data 101 to the selected image forming apparatus.

In the first image forming apparatus 1, the print target data transfer section 113 receives the transfer request through the communication section 16 and transfers the piece of print target data 101 indicated by the transfer request to another image forming apparatus (for example, the second image forming apparatus 2) indicated by the transfer request. In the other image forming apparatus having received the piece of print target data 101, the piece of print target data 101 is subjected to print processing, so that the user can acquire a desired document.

Second Example

A second example is an example in which a computer, such as a desktop PC or a laptop PC, is used as the user terminal 3. In the second example, the first image forming apparatus 1 stores notification information directly in a particular directory in the computer as the user terminal 3.

In the first image forming apparatus 1, the control section 110 previously stores respective directory paths of a plurality of user terminals as candidates for notification destinations of notification information. The directory path is, for example, a path represented in conformity to a protocol, such as SMB (server message block) or FTP (file transfer protocol). In sending the notification information, the control section 110 allows the display section 17 to display an operation screen for the selection of a notification destination which is to be notified that print target data 101 has been accepted.

Figure 6A:
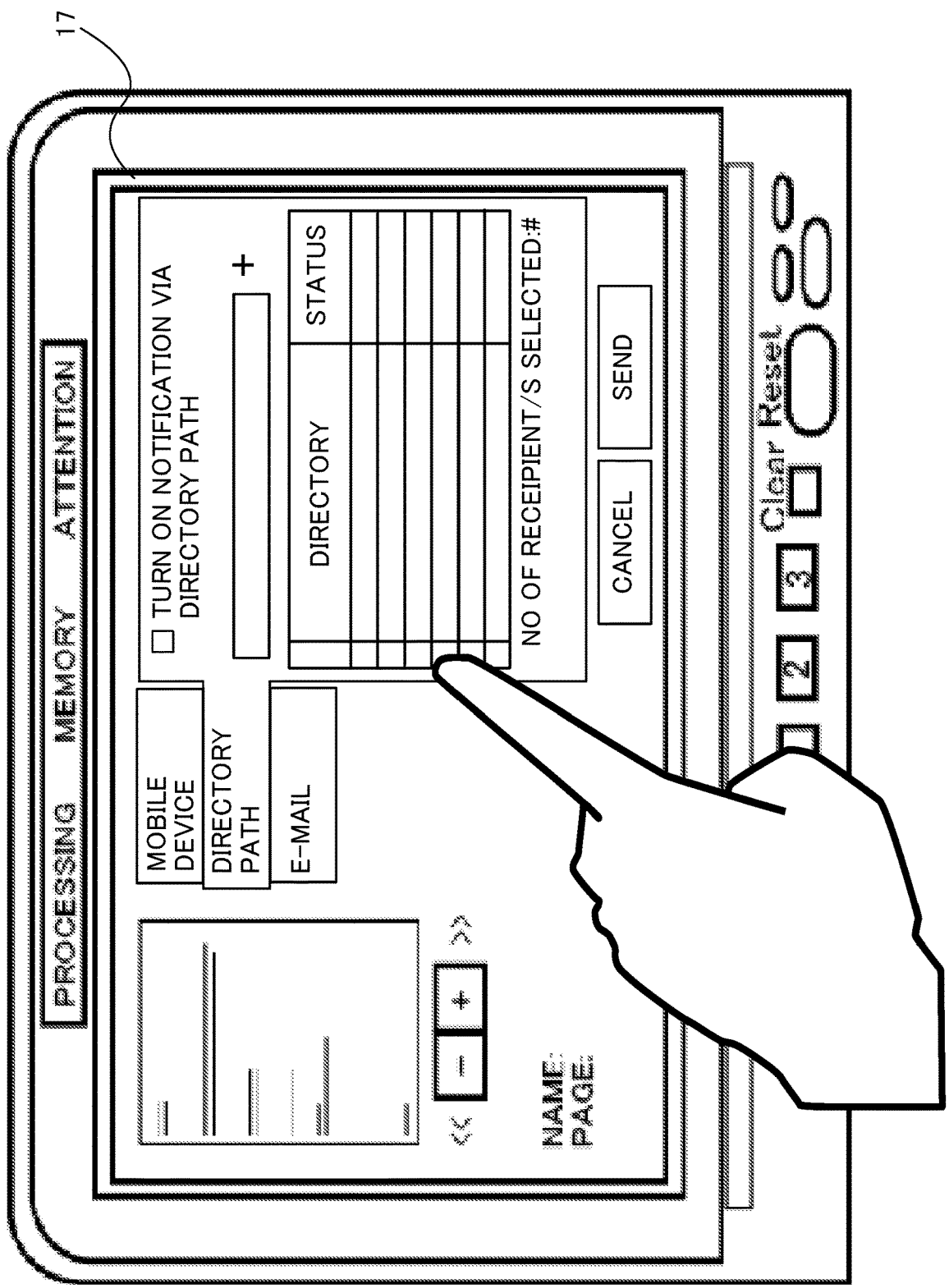
FIG. 6A is a view showing an example of an operation screen for selecting a directory of a notification destination.

FIG. 6A is a view showing an example of the operation screen for selecting a directory of a notification destination. FIG. 6B is an enlarged view of a directory list in FIG. 6A. The control section 110 of the first image forming apparatus 1 previously stores respective directory paths of a plurality of computers as candidates for notification destinations of notification information. The control section 110 allows the directory paths of the plurality of computers to be displayed as a directory list on the operation screen. When the sender performs an operation for selecting a notification destination from the directory list on the operation screen displayed on the display section 17 by making a touch gesture on a portion where a desired directory path is displayed, the touch panel accepts the selection of the notification destination based on the touch gesture. The touch panel is capable of accepting the selection of a plurality of notification destinations at a time.

The information notifying section 112 sends the above notification information through the communication section 16 to a computer having a directory indicated by the directory path selected as the notification destination. If the touch panel has accepted the selection of a plurality of notification destinations, the information notifying section 112 sends the above notification information through the communication section 16 to each of the computers having respective directories indicated by the directory paths selected as the notification destinations.

The control section 31 of the computer having received the notification information through the data sending/receiving section 35 stores the notification information in a predetermined particular directory (the directory indicated by the directory path displayed on the operation screen). In doing so, for example, the information notifying section 112 stores the notification information in encrypted form. The reason for this is to prevent meta-information on the print target data 101 from being unauthorizedly seen by unexpected persons.

A printer driver installed on the computer detects that the encrypted notification information has been stored in the particular directory, and decrypts the encrypted notification information. The control section 31 allows the display section 37 to display meta-information on print target data 101 indicated by the decrypted notification information. The printer driver detects, at a predetermined time, the above notification information stored in the directory. This time of detection is, for example, the time of startup of the computer, the time of return of the computer from sleep mode, a predetermined time of day or a timing when new notification information has been stored. The user can arbitrarily change the directory in which notification information is to be stored, by inputting an instruction to change the directory through the operation of the operating section 34. According to the input instruction, the control section 31 changes the directory in which notification information is to be stored.

FIG. 7 is a view showing an example of a screen transition on the computer as the user terminal 3. For example, when the notification information sent from the first image forming apparatus 1 is stored in encrypted form in the particular directory of the computer, the printer driver detects the above notification information stored in the directory and decrypts the detected notification information and the control section 31 allows the display section 37 to display meta-information on the print target data 101. For example, as shown as "DISPLAY OF META-INFORMATION ON PRINT TARGET DATA" in the left part of FIG. 7, three pieces of print target data 101 having respective document titles, "Doc A", "Doc B", and "Doc C", are displayed on a display screen of the display section 37. Thus, it is shown that the three pieces of print target data 101 having respective document titles, "Doc A", "Doc B", and "Doc C", are stored in the directory. When the user of the computer makes a touch gesture on a portion of the display screen where an arbitrary one of the document titles is displayed, the touch panel 38 accepts the selection of a piece of print target data 101 displayed on the portion where the touch gesture has been made. Alternatively, when the user makes a touch gesture on a "Print All" button on the display screen, the touch panel 38 accepts an instruction to select all the pieces of print target data 101 displayed on the display screen. Still alternatively, if none of the pieces of print target data 101 is needed, the user makes a touch gesture on an "Ignore All" button. Thus, the touch panel 38 accepts an instruction to terminate the print target data transfer processing and the control section 31 terminates the print target data transfer processing.

For example, when the user clicks a portion of the display screen of the display section 37 of the computer where an arbitrary one of the document titles is displayed, thus selecting a particular piece of print target data 101, the control section 31 allows the display section 37 to display detailed information on the selected piece of print target data 101 (shown as a "DISPLAY OF DETAILS ON SELECTED PIECE OF PRINT TARGET DATA" in the middle part of FIG. 7). Then, when the user makes a touch gesture on a "Print" button, the touch panel 38 accepts an instruction to transfer the piece of print target data 101 and the control section 31 allows the display section 37 to display a selection screen showing candidates for destinations of transfer of the selected piece of print target data 101 (shown as a "DISPLAY OF CANDIDATES FOR DESTINATIONS OF TRANSFER" in the right part of FIG. 7).

When the user makes a touch gesture on a portion of the selection screen where an arbitrary one of the destinations of transfer is displayed, the touch panel 38 accepts the selection of the destination of transfer displayed on the portion where the touch gesture has been made (for example, the selection of the second image forming apparatus 2). The control section 31 sends, through the data sending/receiving section 35 to the first image forming apparatus 1, a transfer request requesting to transfer the selected piece of print target data 101 to the selected image forming apparatus. In the first image forming apparatus 1, the print target data transfer section 113 having received the transfer request through the communication section 16 transfers the piece of print target data 101 indicated by the transfer request to the image forming apparatus (for example, the second image forming apparatus 2) indicated by the transfer request. In the other image forming apparatus having received the piece of print target data 101, the piece of print target data 101 is subjected to print processing. Thus, the user can acquire a document based on the piece of print target data 101.

Third Example

A third example is, like the second example, an example in which a computer, such as a desktop PC or a laptop PC, is used as the user terminal 3. However, in the third example, the first image forming apparatus 1 sends notification information by mail.

The storage section 15 of the first image forming apparatus 1 previously stores a plurality of mail addresses as candidates for notification destinations of notification information. In sending the notification information, the control section 110 allows the display section 17 to display an operation screen for displaying the stored mail addresses and for the selection of a notification destination which is to be notified that print target data 101 has been accepted.

Figure 8A:
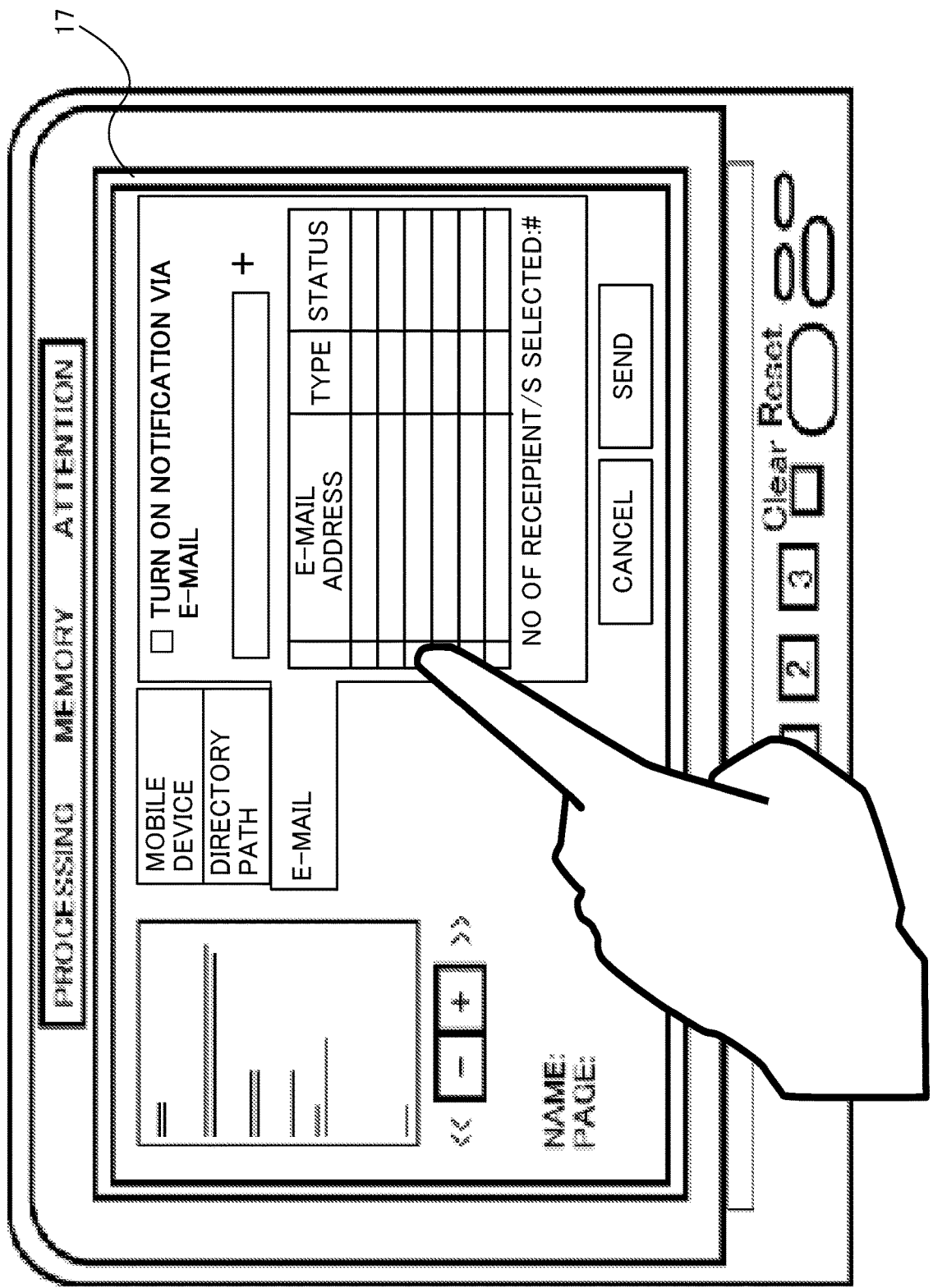
FIG. 8A is a view showing an example of an operation screen for selecting a mail address of a notification destination.

FIG. 8A is a view showing an example of an operation screen for selecting a mail address of a notification destination. FIG. 8B is an enlarged view of a mail address list in FIG. 8A. The storage section 15 of the first image forming apparatus 1 previously stores a plurality of mail addresses as candidates for notification destinations of notification information. The control section 110 allows the display section 17 to display an operation screen containing the mail addresses. When a sender makes a touch gesture on a portion of the operation screen displayed on the display section 17, the portion where an arbitrary one of the mail addresses is displayed, the touch panel 38 accepts an instruction to select as a notification destination the mail address displayed on the portion where the touch gesture has been made. The touch panel is capable of accepting the selection of a plurality of notification destinations at a time.

The information notifying section 112 sends, by mail, the notification information to a notification destination indicated by the mail address selected as the notification destination. If the touch panel has accepted the selection of a plurality of notification destinations, the information notifying section 112 sends the above notification information through the communication section 16 to each of the computers indicated by mail addresses selected as the notification destinations.

For example, the information notifying section 112 sends, by mail, an encrypted file in which the notification information is encrypted. For example, on the computer as the user terminal 3, the user performs an operation for opening the mail through the operating section 34 and stores the encrypted file attached to the mail in a particular directory of the storage section of the computer. The reason why the notification information containing meta-information on print target data 101 is encrypted in the above manner is to prevent the meta-information on the print target data 101 from being unauthorizedly seen by unexpected persons.

A printer driver installed on the computer detects that the encrypted file has been stored in the particular directory, and decrypts the encrypted file. The control section 31 allows the display section 17 to display the meta-information on the print target data 101 contained in the decrypted file. The printer driver detects, at a predetermined time, the above encrypted file stored in the directory. This time of detection is, for example, the time of startup of the computer, the time of return of the computer from sleep mode, a predetermined time of day or a timing when new notification information has been stored. The user can arbitrarily change the directory in which the encrypted file is to be stored, by inputting an instruction to change the directory through the operation of the operating section 34. According to the input instruction, the control section 31 changes the directory in which the encrypted file is to be stored.

The example of the screen display on the user terminal 3 and the operation of the printer driver installed on the user terminal 3 are the same as those in the above-described second example.

In the third example, a mail address is selected as a notification destination of notification information. Such mail addresses include in-company, i.e., internal mail addresses (for example, those specified by Type "Official" in FIG. 8B) and out-of-company, i.e., external mail addresses (for example, those specified by Type "External" in FIG. 8B). If an external mail address is mistakenly selected and notification information is sent to the address, an internal classified document may be passed to an external person. To avoid this, the control section 110 may allow the display section 17 to display a mail address list in which internal mail addresses are distinguishable from external mail addresses and display, if an external mail address is selected, a message M notifying the sender of a warning as shown in FIG. 8B.

The present disclosure is not limited to the configuration of the above embodiment and can be modified in various ways. For example, although in the above embodiment the first image forming apparatus 1 according to the present disclosure is a multifunction peripheral, it is merely illustrative and the first image forming apparatus 1 according to the present disclosure may be a printer or facsimile device with a touch panel.

The structure and configuration described in the above embodiment with reference to FIGS. 1 to 8B are merely illustrative and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:

1. A print target data transfer system comprising a first image forming apparatus, a second image forming apparatus, and user terminals, the first image forming apparatus comprising:
a storage section that stores data;
a first display section; and
a control unit including a processor, wherein when the processor executes a control program, the control unit functions as:
  a print target data acceptance section that accepts print target data and allows the storage section to store the accepted print target data;
  an information notifying section that generates notification information notifying that the print target data has been accepted, the notification information containing meta-information on the print target data, and sends the generated notification information to a designated notification destination; and
  a control section that allows the first display section to display a plurality of the user terminals previously registered as candidates for notification destinations of the notification information; and
a first operating section that accepts a selection of, from among the plurality of the user terminals displayed on the first display section, one or more of the user terminals serving as destinations of the notification information,
wherein the information notifying section sends the notification information to all the user terminals the selections of which have been accepted by the first operating section, the user terminal comprising:
a terminal-side display section;
a data sending/receiving section that receives the notification information from the first image forming apparatus;
a terminal-side control unit including a processor, wherein when the processor executes a control program, the terminal-side control unit functions as a terminal-side control section that allows the terminal-side display section to display the meta-information on the print target data contained in the notification information received by the data sending/receiving section; and
a terminal-side operating section that accepts a selection of an arbitrary piece of print target data from among pieces of print target data indicated by the meta-information which the terminal-side display section is allowed to display by the terminal-side control section,
wherein when the selection of the piece of print target data is accepted by the terminal-side operating section, the terminal-side control section allows the terminal-side display section to display the second image forming apparatus as a candidate for destination of transfer of the selected piece of print target data,
wherein when the selection of the candidate for destination of transfer is accepted by the terminal-side operating section, the terminal-side control section sends to the first image forming apparatus a transfer request to transfer to the second image forming apparatus which is the selected candidate for destination of transfer the piece of print target data the selection of which has been accepted by the terminal-side operating section,
wherein in the first image forming apparatus the control unit further functions as a print target data transfer section that transfers the selected piece of print target data to the second image forming apparatus which is the selected candidate for destination of transfer, according to the transfer request sent from any of the user terminals to which the notification information has been sent, and wherein the second image forming apparatus which is the selected candidate for destination of transfer receives the piece of print target data transferred from the first image forming apparatus and executes processing for printing the received piece of print target data.

2. The print target data transfer system according to claim 1,
wherein in the first image forming apparatus
the control section allows the first display section to display respective directory paths of the plurality of user terminals previously registered as candidates for notification destinations of the notification information,
the first operating section accepts a selection of, from among the directory paths displayed on the first display section, an arbitrary directory path, and
the print target data transfer section sends the notification information to the user terminal having a directory indicated by the directory path the selection of which has been accepted by the first operating section, and
wherein in the user terminal
when the data sending/receiving section receives the notification information from the first image forming apparatus, the terminal-side control section allows the notification information to be stored in the directory predetermined and allows the first display section to display the meta-information on the print target data indicated by the notification information.

3. The print target data transfer system according to claim 1,
wherein in the first image forming apparatus
the control section allows the first display section to display respective mail addresses of the plurality of user terminals previously registered as candidates for notification destinations of the notification information, and
the information notifying section sends by mail the notification information to a notification destination indicated by the mail address the selection of which has been accepted as the notification destination by the first operating section, and
wherein in the user terminal
when the data sending/receiving section receives the notification information by mail, the terminal-side control section allows the notification information to be stored in a predetermined directory and allows, at a time of startup of the user terminal, a time of return of the user terminal from sleep mode, a predetermined time of day, or a timing when new notification information has been stored in the user terminal, the first display section to display, based on the notification information detected from the directory, the meta-information on the print target data indicated by the notification information.

4. The print target data transfer system according to claim 3, wherein in the first image forming apparatus the control section allows the first display section to display the mail addresses so that an internal mail address and an external mail address are distinguished from each other, and display a warning when the external mail address is selected.

5. The print target data transfer system according to claim 1, wherein after transferring the selected piece of print target data to the second image forming apparatus, the print target data transfer section deletes the selected piece of print target data from the storage section.

6. The print target data transfer system according to claim 2, wherein when the data sending/receiving section receives the notification information from the first image forming apparatus, the terminal-side control section allows the notification information to be stored in encrypted form in the directory path predetermined and allows the first display section to display the meta-information on the print target data indicated by notification information obtained by decrypting the encrypted notification information.

7. The print target data transfer system according to claim 3, wherein
the information notifying section sends by mail an encrypted file containing the notification information in encrypted form to a notification destination indicated by the mail address the selection of which has been accepted as the notification destination by the first operating section, and
when the data sending/receiving section receives the encrypted file by mail, the terminal-side control section allows the encrypted file to be stored in the predetermined directory and allows the first display section to display, at a predetermined time, based on notification information obtained by decrypting the encrypted file detected from the directory, the meta-information on the print target data indicated by the notification information.

8. An image forming apparatus comprising:
a storage section that stores data;
a first display section; and
a control unit including a processor, wherein when the processor executes a control program, the control unit functions as:
a print target data acceptance section that accepts print target data and allows the storage section to store the accepted print target data;
an information notifying section that generates notification information notifying that the print target data has been accepted, the notification information containing meta-information on the print target data, and sends the generated notification information to a user terminal as a designated notification destination; and
a control section that allows the first display section to display a plurality of the user terminals previously registered as candidates for notification destinations of the notification information; and
a first operating section that accepts a selection of, from among the plurality of the user terminals displayed on the first display section, one or more of the user terminals serving as destinations of the notification information,
wherein the information notifying section sends the notification information to all the user terminals the selections of which have been accepted by the first operating section, and
wherein the control unit further functions as a print target data transfer section that transfers, according to a transfer request sent from any of all the user terminals the selections of which have been accepted by the first operating section, print target data indicated by the transfer request to a second image forming apparatus as a destination of transfer indicated by the transfer request.

* * * * *